United States Patent [19]

Wirtz

[11] Patent Number: 4,491,123
[45] Date of Patent: Jan. 1, 1985

[54] STABILIZER COUPLING

[76] Inventor: Gregory T. Wirtz, 1462 Canterbury, Muskegon, Mich. 49444

[21] Appl. No.: 362,904

[22] Filed: Mar. 29, 1982

[51] Int. Cl.³ .............................................. B23P 19/04
[52] U.S. Cl. ..................................................... 124/89
[58] Field of Search .................. 124/89, 23 R, 24 R, 124/88; 81/177.8, 177.9; 403/93, 96

[56] References Cited

U.S. PATENT DOCUMENTS

| | | | |
|---|---|---|---|
| 1,670,188 | 5/1928 | Castelli | 81/177.8 |
| 1,962,126 | 6/1934 | Andersen | 45/11 |
| 2,191,348 | 2/1940 | Lauterbach | 287/86 |
| 2,455,150 | 11/1948 | Verderber | 273/79 |
| 2,533,949 | 12/1950 | Maus | 248/121 |
| 3,017,874 | 1/1962 | Gubash | 124/48 X |
| 3,196,860 | 7/1965 | Hoyt, Jr. | 124/24 |
| 3,256,872 | 6/1966 | Koser | 124/23 |
| 3,342,172 | 9/1967 | Sanders | 124/89 X |
| 3,412,725 | 11/1968 | Hoyt | 124/89 X |
| 3,419,295 | 12/1968 | Small | 273/81.3 X |
| 3,450,122 | 6/1969 | Diamond | 124/24 |
| 3,468,297 | 9/1969 | Cress | 124/24 |
| 3,502,062 | 3/1970 | Shurts | 124/23 |
| 3,512,512 | 5/1970 | Wentz | 124/24 |
| 3,524,441 | 8/1970 | Jeffery | 124/24 |
| 3,537,439 | 11/1970 | Joslin | 124/24 |
| 3,589,350 | 6/1971 | Hoyt, Jr. | 124/24 |
| 3,628,520 | 12/1971 | Izuta | 124/30 R |
| 3,670,712 | 6/1972 | Izuta | 124/30 R |
| 3,683,883 | 8/1972 | Izuta | 124/30 R |
| 3,752,142 | 8/1973 | Morita et al. | 124/24 |
| 3,757,761 | 9/1973 | Izuta | 124/23 |
| 3,804,072 | 4/1974 | Izuta | 124/24 R |
| 3,844,268 | 10/1974 | Ikeya | 124/24 R |
| 4,054,121 | 10/1977 | Hoyt | 124/89 |
| 4,091,790 | 5/1978 | Hoyt, Jr. | 124/24 R |
| 4,135,486 | 1/1979 | Enomoto | 124/89 |
| 4,169,454 | 10/1979 | Jones | 124/23 R |
| 4,245,612 | 1/1981 | Finlay | 124/89 |
| 4,324,221 | 4/1982 | Peck | 124/41 A X |

Primary Examiner—Richard J. Apley
Assistant Examiner—William R. Browne
Attorney, Agent, or Firm—Price, Heneveld, Huizenga & Cooper

[57] ABSTRACT

An archery bow stabilizer mounting bracket includes first and second pivotally interconnected members adapted to be secured to a bow and a stabilizer, respectively. The members include detent structures for selectively securing the stabilizer in an operative or inoperative position. The members are resiliently positioned with respect to one another to facilitate operation of the detent structure and to improve the shock-absorbing characteristics of the stabilizer.

14 Claims, 9 Drawing Figures

STABILIZER COUPLING

BACKGROUND OF THE INVENTION

The present invention relates to stabilizers for archery bows, and more particularly to a bracket for mounting a stabilizer to a bow.

When an arrow is released from an archery bow, the bow tends to follow the arrow because of the forward momentum of the string. Forces exerted on the bow during release impart both a forward movement and a rotational movement to the bow. Release of an arrow also causes shock in the bow. The shock and torque imparted to the bow are uncomfortable and fatiguing to the archer. These factors can have an adverse effect on accuracy.

Archery bow stabilizers have been developed which are designed to absorb or dampen the shock and counteract the torque created during arrow release. Typically, the stabilizers are mounted to the hand grip of the bow and extend forwardly therefrom. Generally, stabilizers include an elongated rod supporting a weight. Examples of such stabilizers may be found in U.S. Pat. No. 3,342,172 entitled ARCHERY BOW LIMB SHOCK CUSHIONING MEANS HAVING A BRACKET WITH PIVOTALLY MOUNTED WEIGHTED EXTENDED ARMS and issued on Sept. 19, 1967 to Sanders; U.S. Pat. No. 3,256,872 entitled STAND AND STABILIZER FOR ARCHERY BOWS and issued on June 21, 1966 to Koser; and U.S. Pat. No. 3,196,860 entitled ARCHERY BOW and issued on July 27, 1965 to Hoyt, Jr.

Various problems may be experienced with mounted stabilizers. For example, the stabilizer may become entangled in brush, branches and the like in the field. The stabilizer must be removed prior to placing the bow in a carrying case. Cases are not adapted to receive a bow and mounted stabilizer.

Brackets have been developed for pivotally mounting the stabilizer to the bow. These devices are not without their drawbacks. Such prior brackets include securing or set screws which must be loosened in order to pivot the stabilizer and then tightened to secure the stabilizer in position. Often, such an operation is excessively time consuming when measured against the time in which a hunter has to direct an arrow toward a spotted animal. Further, the stabilizer must be carefully oriented into its operative position before the securing screw is retightened. An example of a pivotal or rotational mounting may be found in U.S. Pat. No. 4,054,121 entitled ADJUSTABLE MOUNTING MEANS FOR ARCHERY BOW STABILIZERS and issued on Oct. 18, 1977, to Hoyt, Jr.

The shock-absorbing characteristics of a stabilizer have been improved by providing a resilient member within the stabilizer. Typically, the resilient member is positioned between the stabilizer rod and the bow. This permits the rod to move or oscillate with respect to the bow. Examples of resiliently mounted stabilizers may be found in U.S. Pat. No. 3,412,725 entitled ARCHERY BOW WITH RESILIENTLY MOUNTED STABILIZER, issued on Nov. 26, 1968, to Hoyt, Jr.; U.S. Pat. No. 3,524,441 entitled DETACHABLY MOUNTED ARCHERY BOW STABILIZING DEVICE, issued on Aug. 18, 1970, to Jeffery; and U.S. Pat. No. 4,245,612 entitled ARCHERY BOW STABILIZER, issued on Jan. 20, 1981 to Finlay. The resilient mount of the stabilizer rods are achieved by rubber bushings, resilient discs and coil springs.

Available resilient mounts secure the stabilizer to the bow in a single, fixed orientation. Although shock absorbing and dampening characteristics are increased, the above-mentioned problems are associated with a fixedly mounted stabilizer remain.

SUMMARY OF THE INVENTION

The aforementioned problems are solved by the present invention. Essentially, an archery bow stabilizer mounting bracket is provided having a first member adapted to be secured to an archery bow, a second member adapted to support a stabilizer and means for pivotally interconnecting the two members. Detent means are included for aligning and securing the two members in either an operative or an inoperative or stored position.

In narrower aspects of the invention, one member is biased towards the other member and relative movement between the members is provided. The stabilizer is, therefore, resiliently mounted to the bow.

The archery bow stabilizer mounting bracket in accordance with the present invention is easily and readily pivotable between, and positively secured in, operative and inoperative positions. This permits the rapid deployment of the stabilizer. The bow may be carried in the field with the stabilizer in the inoperative position. This prevents or reduces the chances of the stabilizer becoming tangled with underbrush. When the archer desires to shoot, the stabilizer may be rapidly and accurately positioned in its operative position by disengaging the detent means, pivoting the stabilizer to its operative position, and re-engaging the detent means in the operative orientation. The detent means properly aligns the stabilizer in its operative position. The biasing means functions as a resilient mount and allows the bow and stabilizer to oscillate with respect to one another after arrow release.

These and other objects, advantages and features of the invention will be more fully understood and appreciated by reference to the written specification and appended drawings.

DESCRIPTION OF THE PREFERRED EMBODIMENT

Figure 3:
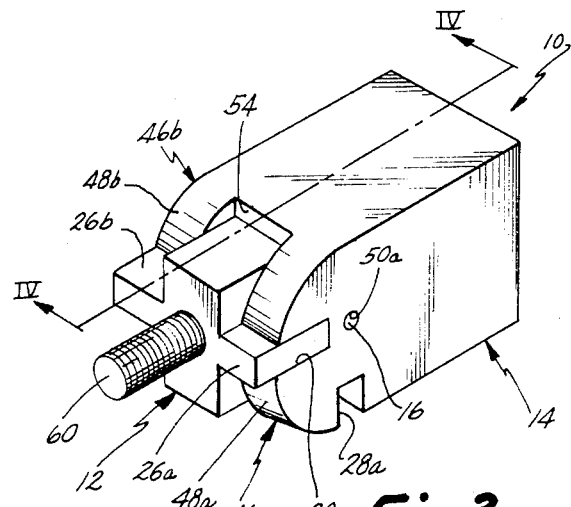
FIG. 3 is a perspective view of the stabilizer coupling or bracket.
Figure 4:
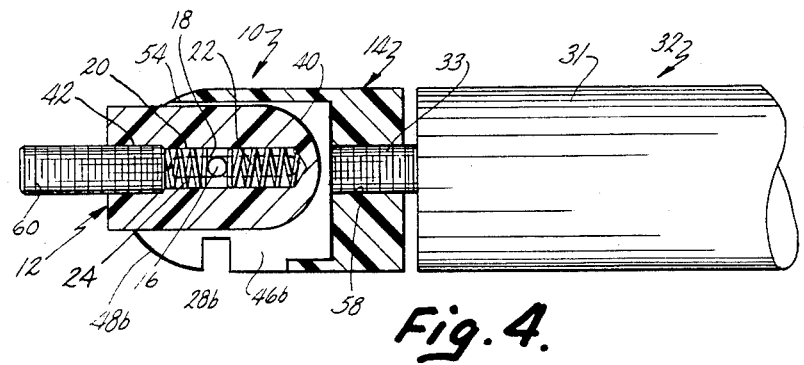
FIG. 4 is a sectional view taken generally along line IV—IV of FIG. 3.
Figure 5:
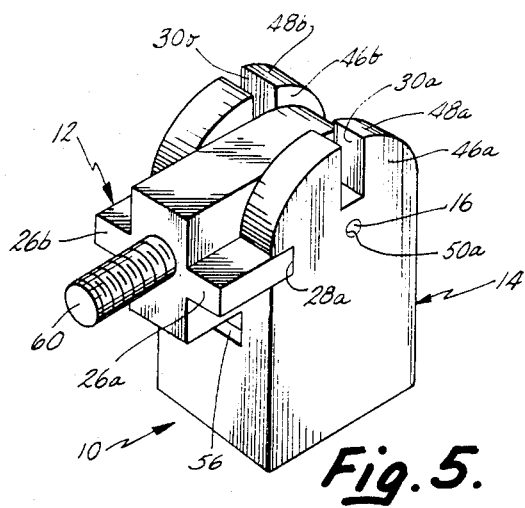
FIG. 5 is a perspective view of the stabilizer coupling or bracket in its inoperative or stored position.
Figure 6:
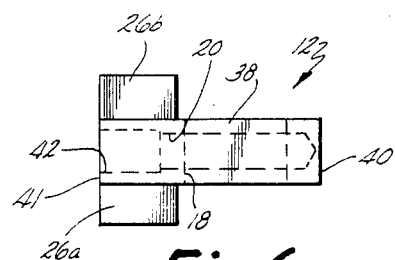
FIG. 6 is a top plan view of the bow member of the coupling.
Figure 7:
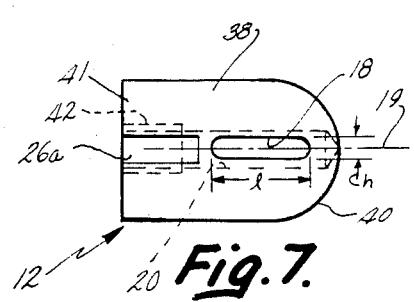
FIG. 7 is a side elevational view of the bow member.

A stabilizer coupling in accordance with a preferred embodiment of the invention is illustrated in the drawings and generally designated 10. As best seen in FIGS. 3, 4, and 5, coupling 10 includes a bow attachment member 12, a stabilizer supporting member 14, and a pin 16 pivotally interconnecting the two members. Bow member 12 includes a body defining an elongated slot 18 (FIGS. 4, 6, and 7). Pin 16 is supported by stabilizer member 14 and extends through slot 18 (FIG. 4). Stabilizer member 14 is free to shift longitudinally of bow member 12 by sliding of pin 16 within slot 18. A spring bore 20 extends through bow member 12 along the longitudinal axis 19 of slot 18 and communicates with the slot. Springs 22 and 24 are located within bore 20 and bear against opposite sides of pin 16. Springs 22 and 24 bias or urge stabilizer member 14 toward a desired central position with respect to bow member 12.

Detent flanges or protrusions 26a and 26b (FIGS. 3, 5, 6, and 7) extend laterally from bow member 12. Stabilizer member 14 defines two pairs of slots 28a and 28b, and 30a and 30b (FIGS. 3, 5, 8, and 9) into which flanges 26 extend when the coupling is in its inoperative (FIG. 5) and operative position (FIG. 3), respectively, to maintain members 12 and 14 in fixed angular relationship. Flanges 26 may be withdrawn from either of slots 28 or 30 by shifting stabilizer member 14 in a direction to compress spring 22 (i.e., away from the bow) so that members 12 and 14 are free to pivot with respect to one another about pin 16.

Bow member 12 (FIGS. 6 and 7) comprises a body portion 38 having a rounded forward end 40 and a planar rear face 41. Flanges 26a and 26b extend generally laterally from body 38 and are generally rectangular when viewed from the top, end, or side of member 12. Elongated slot 18 extends transversely through, and longitudinally of, body 38. Slot 18 has a length 1 greater than its height h.

An internally threaded stud bore 42 extends through rear face 41 into body 38 and terminates short of slot 18. As seen in FIG. 4, a bow stud 60 is threadedly secured within bore 42 to provide a means for attaching coupling 10 to a bow. Spring bore 20 is coaxial with and has a smaller diameter than stud bore 42. Spring bore 20 extends from stud bore 42 to a point just short of rounded end 40. Spring bore 20 extends completely through and communicates with slot 18.

Figure 8:
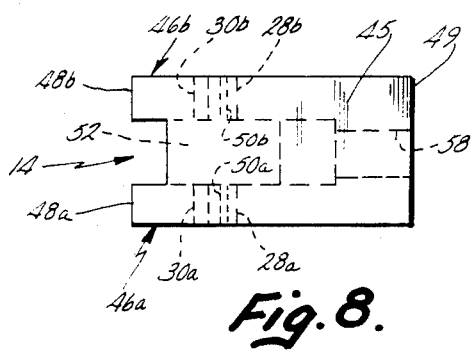
FIG. 8 is a top plan view of the stabilizer member of the coupling.
Figure 9:
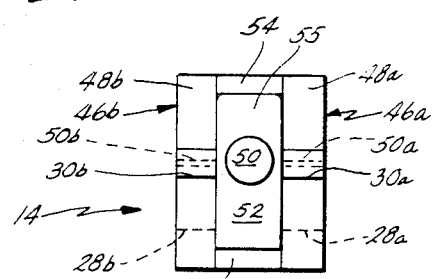
FIG. 9 is an end elevational view of the stabilizer member.

As seen in FIGS. 8 and 9, stabilizer member 14 is bifurcated and includes a body portion 45 having a forward face 49 and a pair of arms 46a and 46b extending from the body portion. Arms 46a and 46b include rounded ends 48a and 48b, respectively. Pin apertures 50a and 50b extend through arms 46a and 46b, respectively, and are located at the centers of the radii of rounded ends 48a and 48b, respectively. An internally threaded, stud-receiving aperture 58 extends through rear face 49 and body portion 45. Slots 30a and 30b extend into arms 46a and 46b, respectively, and are radially aligned with apertures 50 and parallel to bore 58. Slots 28a and 28b extend into arms 46a and 46b, respectively, and are also generally radially aligned with pin apertures 50, but are perpendicular to bore 58. Slot pairs 30a, 30b, and 28a, 28b are at a right angle with respect to each other. A bow member receiving chamber 52 is defined by body portion 45, arms 46a and 46b, and upper and lower flanges 54 and 56 extending between the arms.

Pin 16 (FIGS. 3, 4, and 5) is supported within member 14 and more particularly within apertures 50a and 50b. Further, pin 16 extends through slot 18 (FIG. 4) to pivotally interconnect members 12 and 14.

Coil springs 22 and 24 (FIG. 4) are positioned within spring bore chamber 20 on opposite sides of pin 16. Spring 22 is compressed between end 40 and pin 16, and spring 24 is compressed between bow stud 60 and pin 16 to maintain stabilizer member 14 in a desired orientation with respect to bow member 12.

Operation

Figure 1:
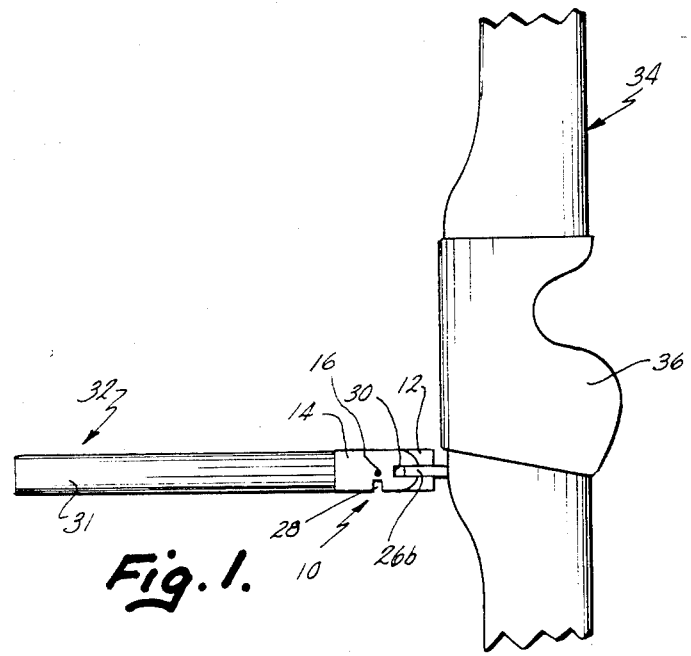
FIG. 1 is a fragmentary, side elevational view of an archery bow including a stabilizer and bracket in accordance with the present invention with the stabilizer in the operative position.
Figure 2:
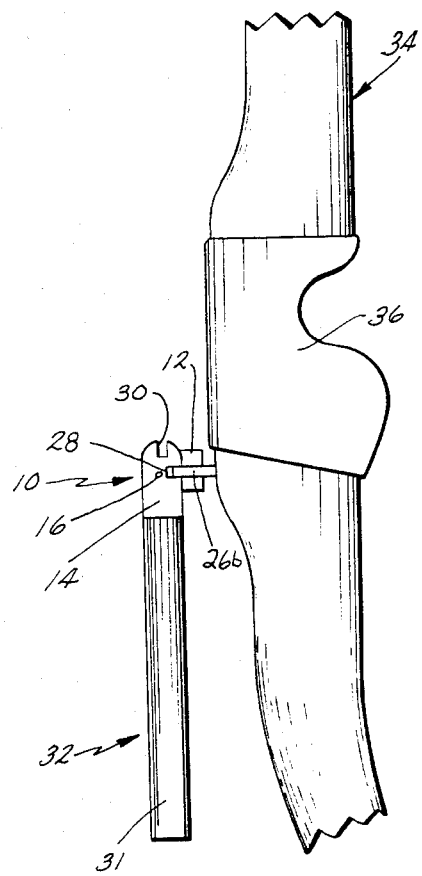
FIG. 2 is a view similar to FIG. 1 showing the stabilizer in the inoperative position.

Coupling 10 as shown in FIGS. 1 and 2, mounts a stabilizer 32 on a bow 34. Stabilizer 32 and bow 34 are well known to those having ordinary skill in the art. Stabilizer 32 may include an elongated weighted body or rod 31 having a threaded stud 33 (FIG. 4) fixedly mounted therein. Bow 34 may be any type of archery bow, for example a compound bow, and includes a hand grip 36. Stabilizer 32 is secured within stabilizer member 14 by threading stud 33 into bore 58 on the stabilizer member. Bracket 10 is mounted on bow 34 by threadedly securing stud 60 within a threaded bore (not shown) on the bow.

Stabilizer 32 is shown in its transportation or storage position in FIG. 2. When in this position, flanges 26 are located within slots 28 (see also FIG. 5). To deploy stabilizer 32 into its operative position as shown in FIG. 1, first either stabilizer member 14 or stabilizer 32 is grasped and urged away from bow 34, shifting pin 16 within slot 18, compressing spring 22 and allowing spring 24 to expand. After flanges 26 are withdrawn from slots 28, stabilizer 32 may be rotated upwardly with flanges 26 optionally riding along rounded ends 48. When flanges 26 are aligned with slots 30 (see also FIG. 3) member 14 or stabilizer 32 is released, whereupon spring 22 urges member 14 toward bow 34 to slide flanges 26 into slots 30 in a detent fashion. Member 14 is automatically and positively locked in the operative position. When stabilizer 32 is to be positioned in its transportation position, the reverse procedure is followed disengaging flanges 26 from slots 30 and repositioning the flanges in slots 28. When in either position, member 14 is locked or held in a positive detent manner with respect to member 12.

When in the operative position as shown in FIG. 1, mounting bracket 10 also provides dampening. Referring also to FIG. 4, it should be noted that slot 18 is oriented in a direction generally parallel to the flight of an arrow (not shown) released from bow 34. Consequently, when the arrow is released, member 14 is free to oscillate with respect to member 12. Pin 16 is free to shift within slot 18 against the bias of springs 22, 24 to dampen movement of bow 34 with respect to stabilizer 32. Coupling or bracket 10, therefore, resiliently mounts the stabilizer. Any movement of the members during arrow release with respect to one another will be damped by the successive compression and expansion of springs 22 and 24 creating an oscillating, dampening motion. This greatly improves the shock-absorbing capabilities of stabilizer 32.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An archery bow stabilizer mounting bracket comprising:
    a first member to be secured to a bow;
    a second member to support a stabilizer;
    means for pivotally interconnecting said first and second members about a first axis and for allowing said first and second members to shift with respect to each other along a second axis, said first and second axes being generally perpendicular to one another; and
    detent means defined in part by said first and second members for selectively securing said first and second members in a detent fashion and in either a first operative position wherein said first and second members are longitudinally aligned along said second axis and a second inoperative position wherein said first and second members are angularly related upon shifting of said second member along said second axis and rotation of said second member with respect to said first member.

2. An archery bow stabilizer mounting bracket as defined in claim 1 wherein said interconnecting means comprises:
    a one of said first and second members defining a pin slot; and
    a pin supported by the other of said first and second members and extending through said pin slot.

3. An archery bow stabilizer mounting bracket as defined in claim 2 wherein said pin slot is elongated transversely of said pin to allow said other of said first and second members to shift transversely of said pin.

4. An archery bow stabilizer mounting bracket as defined in claim 3 wherein said detent means comprises:
    a protrusion extending from said one of said first and second members; and
    said other of said first and second members defining first and second protrusion slots for receiving said protrusion when said members are oriented in said first and second positions, respectively.

5. An archery bow stabilizer mounting bracket as defined in claim 4 further comprising biasing means engaging said pin for resiliently positioning said second member with respect to said first member.

6. An archery bow stabilizer mounting bracket comprising:
    a bow member including means for securing said bow member to a bow;
    a stabilizer member including means for supporting a stabilizer;
    pivot means for pivotally interconnecting said members about a first axis and for allowing said stabilizer member to shift along a second axis, said first and second axes being generally perpendicular to one another; and
    spring means engaging said stabilizer member for urging said stabilizer member into a desired position and permitting said stabilizer member to oscillate along said second axis in two opposite directions from said desired position to absorb shock and dampen the movement of a bow to which said stabilizer is secured.

7. An archery bow stabilizer mounting bracket as defined in claim 6, further including:
    detent means defined by said bow and stabilizer members for selectively locking said members in an operative position or an inoperative position.

8. An archery bow stabilizer mounting bracket as defined in claim 7 wherein said pivot means comprises:
    said bow member defining an elongated slot extending parallel to said second axis; and
    a pin supported by said stabilizer member and extending through said slot.

9. An archery bow stabilizer mounting bracket as defined in claim 8 wherein said spring means comprises first and second springs bearing against opposite sides of said pin, said bow member defining a spring bore opening into said slot and within which said springs are disposed, said first and second springs being alternately compressed when said stabilizer member oscillates.

10. An archery bow stabilizer mounting bracket as defined in claim 7 wherein said detent means comprises:
    a protrusion extending from one of said bow and stabilizer members; and
    the other of said bow and stabilizer members defining first and second angularly related slots for receiving said protrusion when said members are oriented in said operative and inoperative positions, respectively.

11. An archery bow stabilizer assembly comprising:
    a first member to be secured to a bow;
    a second member;
    a stabilizer rod secured to said second member;
    pivot means for pivotally interconnecting said first and second members about a first axis so that said second member may be pivoted between an operative position in line with said first member and an inoperative position generally perpendicular to a longitudinal axis of said first member;
    detent means for automatically locking said first and second members in either of said positions upon rotation of said second member with respect to said first member; and
    shock-absorbing means disposed between said members for urging said second member into a desired position with respect to said first member and permitting said second member to oscillate along a second axis in two opposite directions from said desired position to absorb shock and dampen bow movement upon arrow release, said first and second axes being generally perpendicular to one another.

12. An archery bow stabilizer as defined in claim 11 wherein said pivot means comprises:
    said first member defining an elongated slot extending parallel to said second axis; and
    a pin carried by said second member and extending through said slot.

13. An archery bow stabilizer as defined in claim 12 wherein said shock-absorbing means comprises first and second coil springs located within said slot and bearing against opposite sides of said pin, said first and second springs being alternately compressed as said second member oscillates to opposite sides of said desired position.

14. An archery bow stabilizer assembly comprising:
    a first member to be secured to a bow;
    a second member;
    a stabilizer rod secured to said second member;

pivot means for pivotally interconnecting said first and second members about a first axis so that said second member may be pivoted between an operative position in line with said first member and an inoperative position generally perpendicular to a longitudinal axis of said first member;

detent means for automatically locking said first and second members in either of said positions upon rotation of said second member with respect to said first member, said detent means including a protrusion extending from one of said first and second members, said detent means further including the other of said first and second members defining first and second angularly related slots for receiving said protrusion when said members are in said operative and inoperative positions; and shock-absorbing means disposed between said members for urging said second member into a desired position and permitting said second member to oscillate along a second axis in two opposite directions from said desired position to absorb shock and dampen bow movement upon arrow release, said first and second axes being generally perpendicular.

* * * * *